Dec. 24, 1940.　　W. E. ROONEY　　2,226,019
FISH-CANNING MACHINE
Filed May 28, 1938　　10 Sheets-Sheet 6

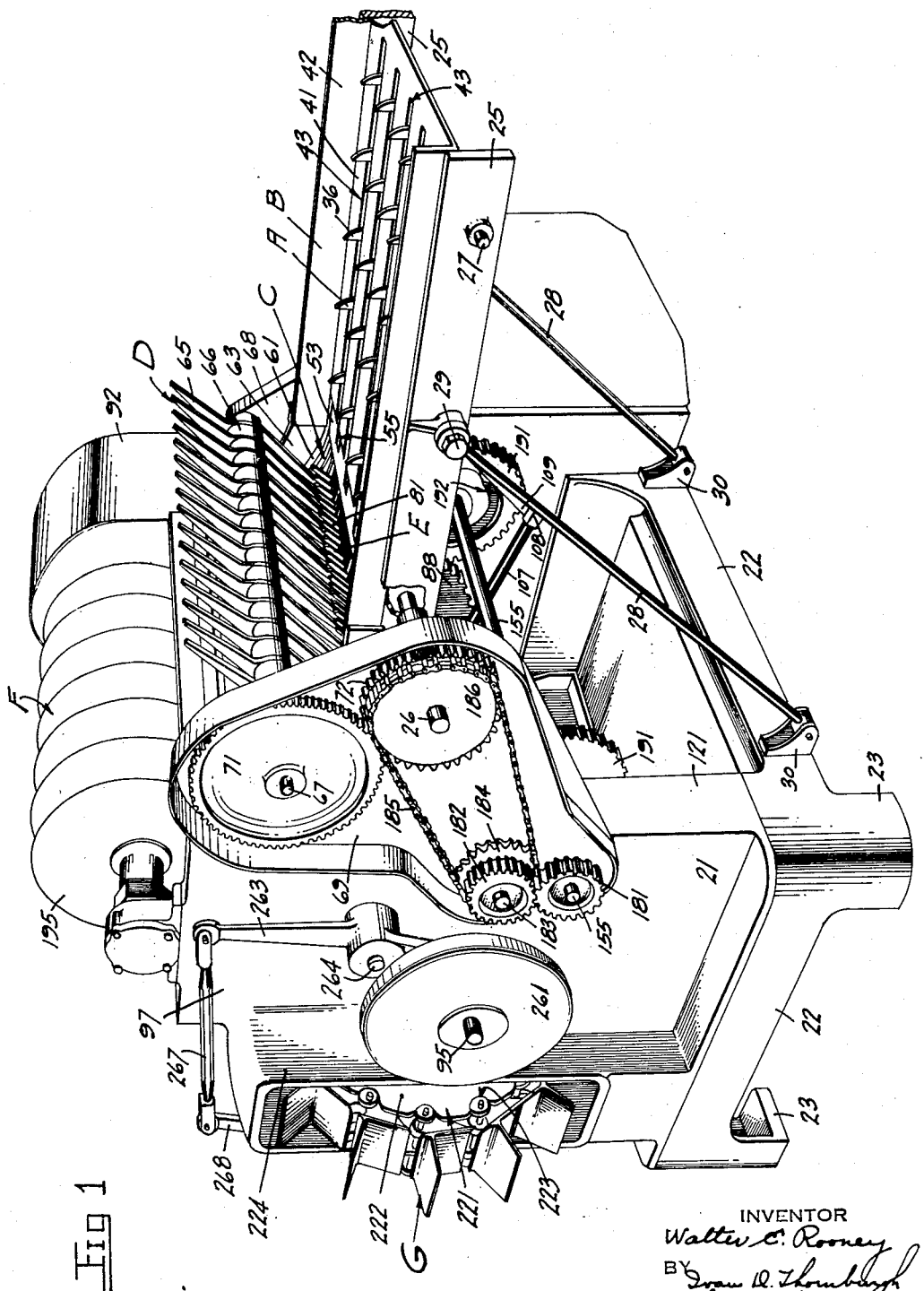

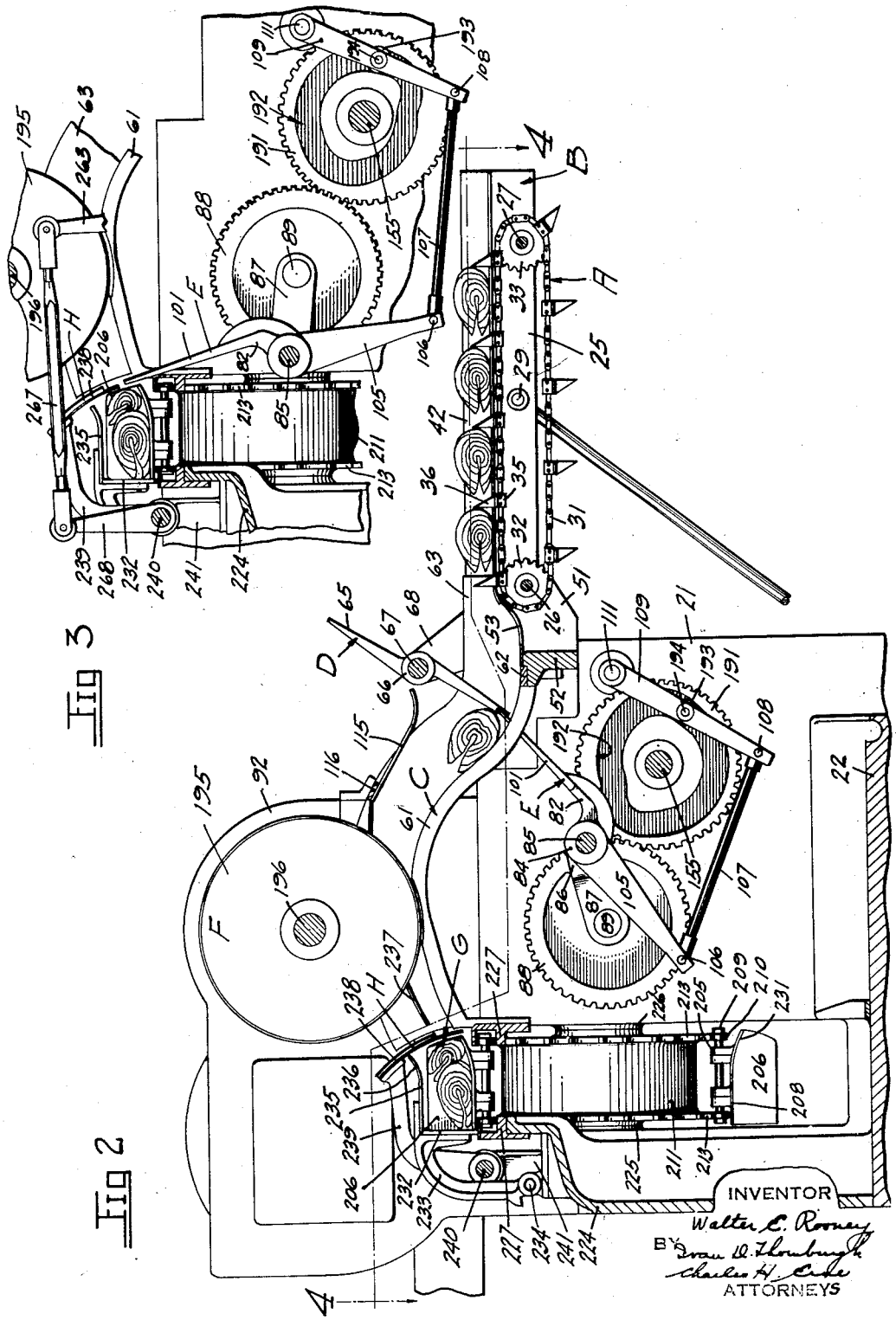

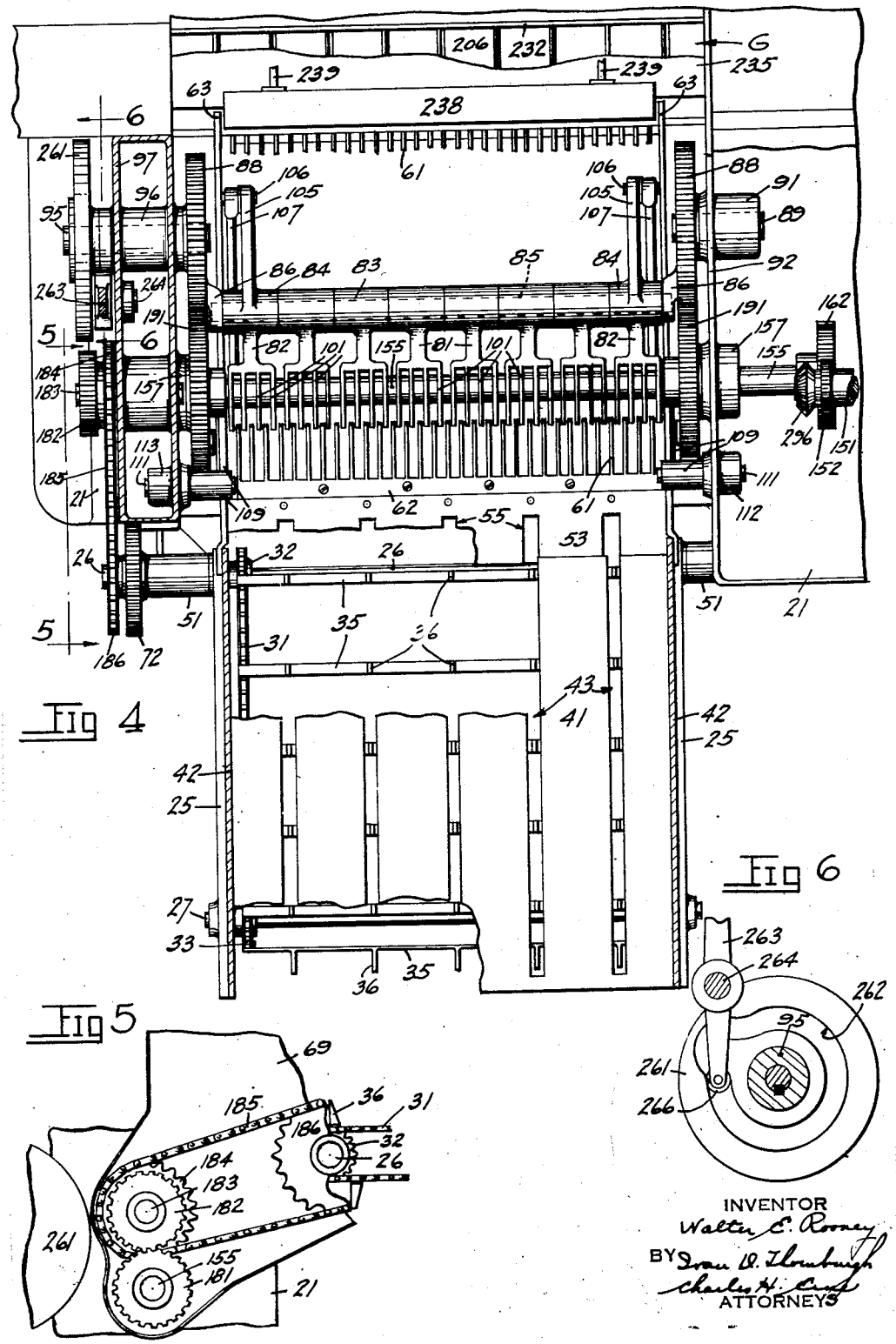

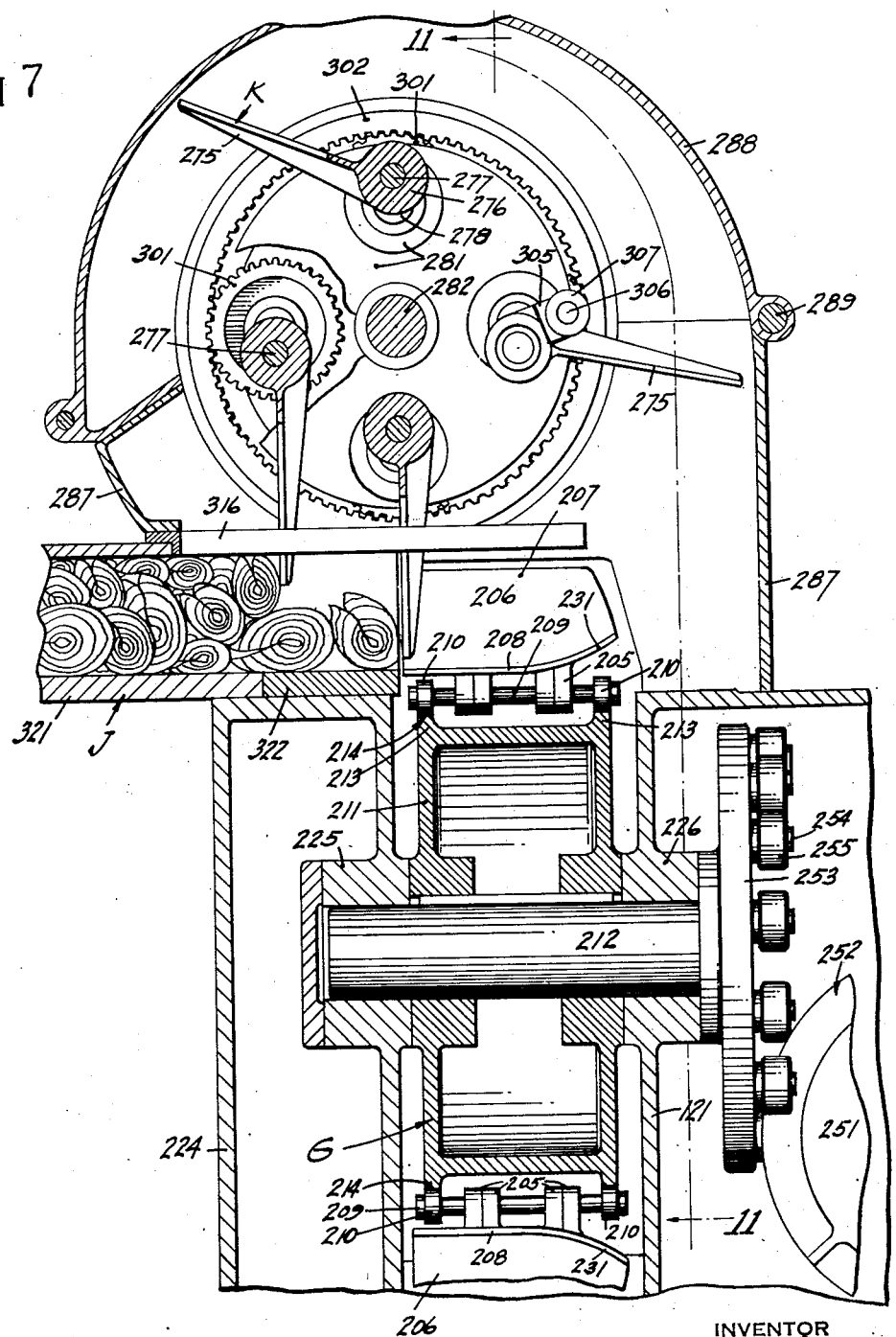

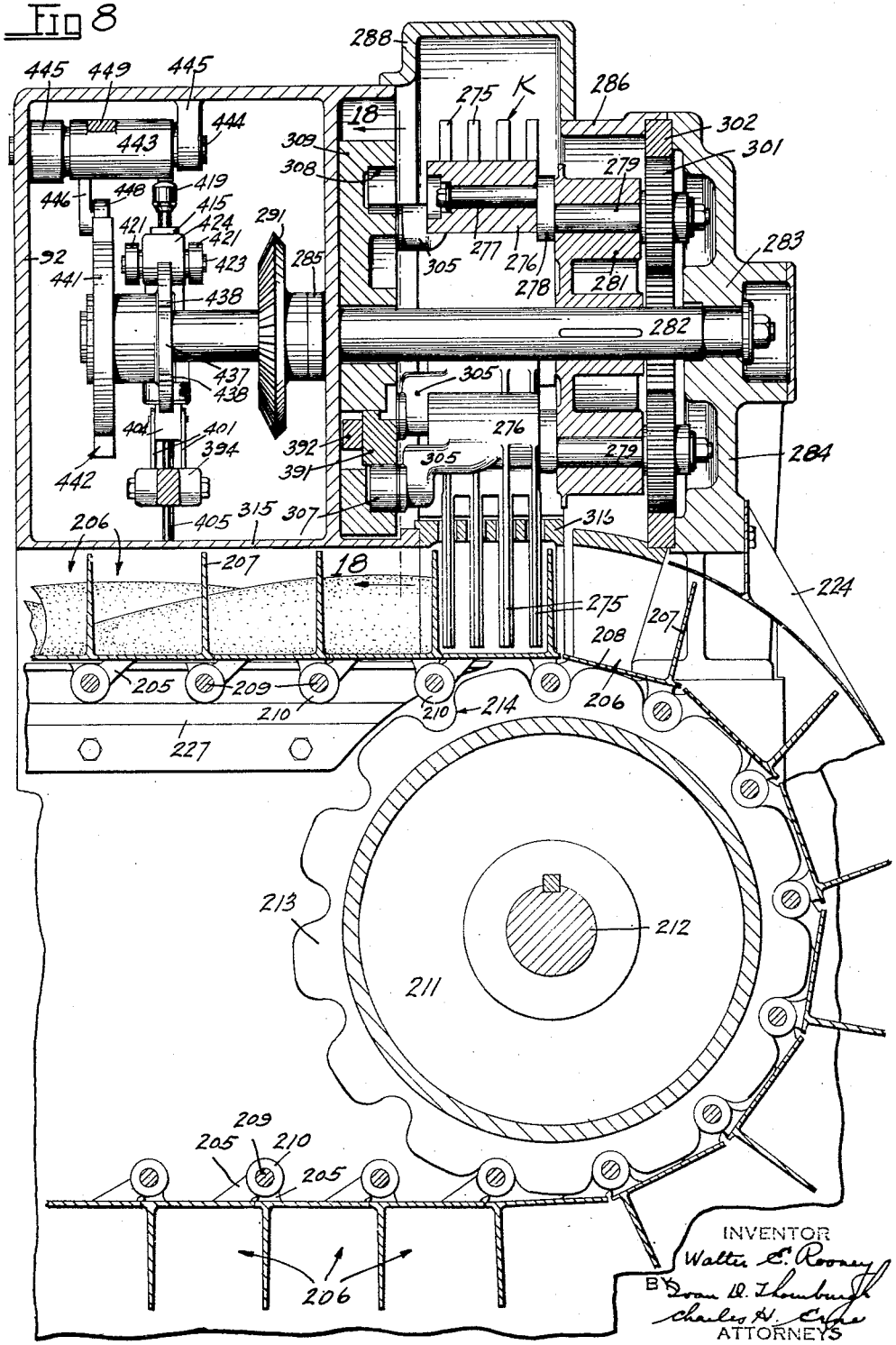

INVENTOR
Walter E. Rooney
BY
ATTORNEYS

Dec. 24, 1940.  W. E. ROONEY  2,226,019
FISH-CANNING MACHINE
Filed May 28, 1938  10 Sheets-Sheet 7
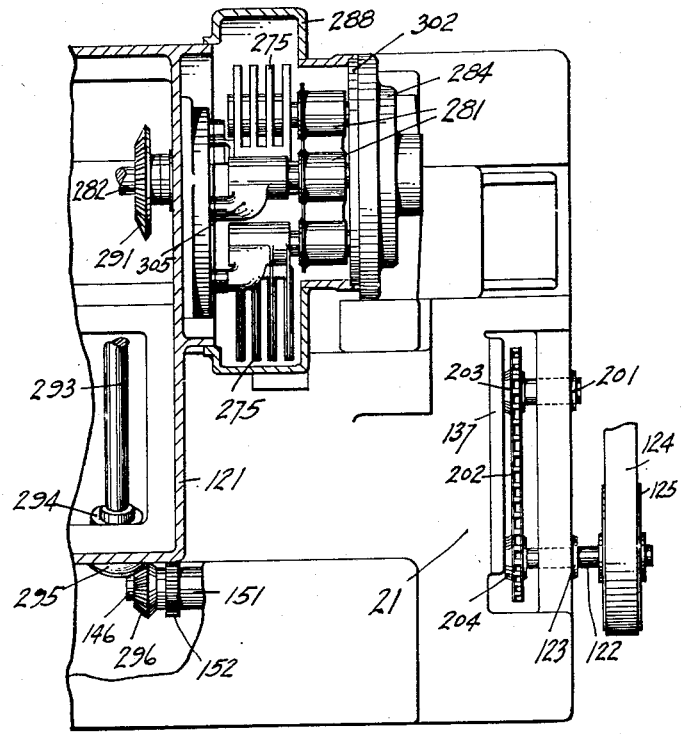
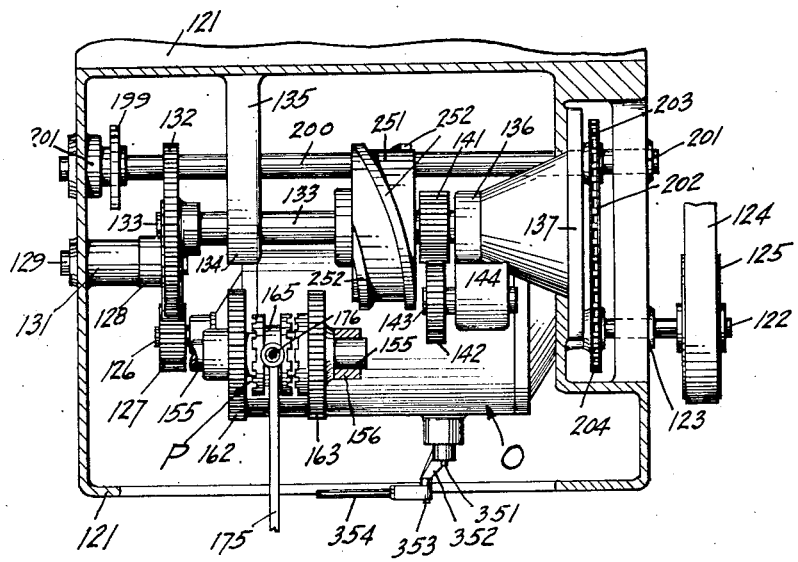
INVENTOR
Walter E. Rooney
BY
ATTORNEYS

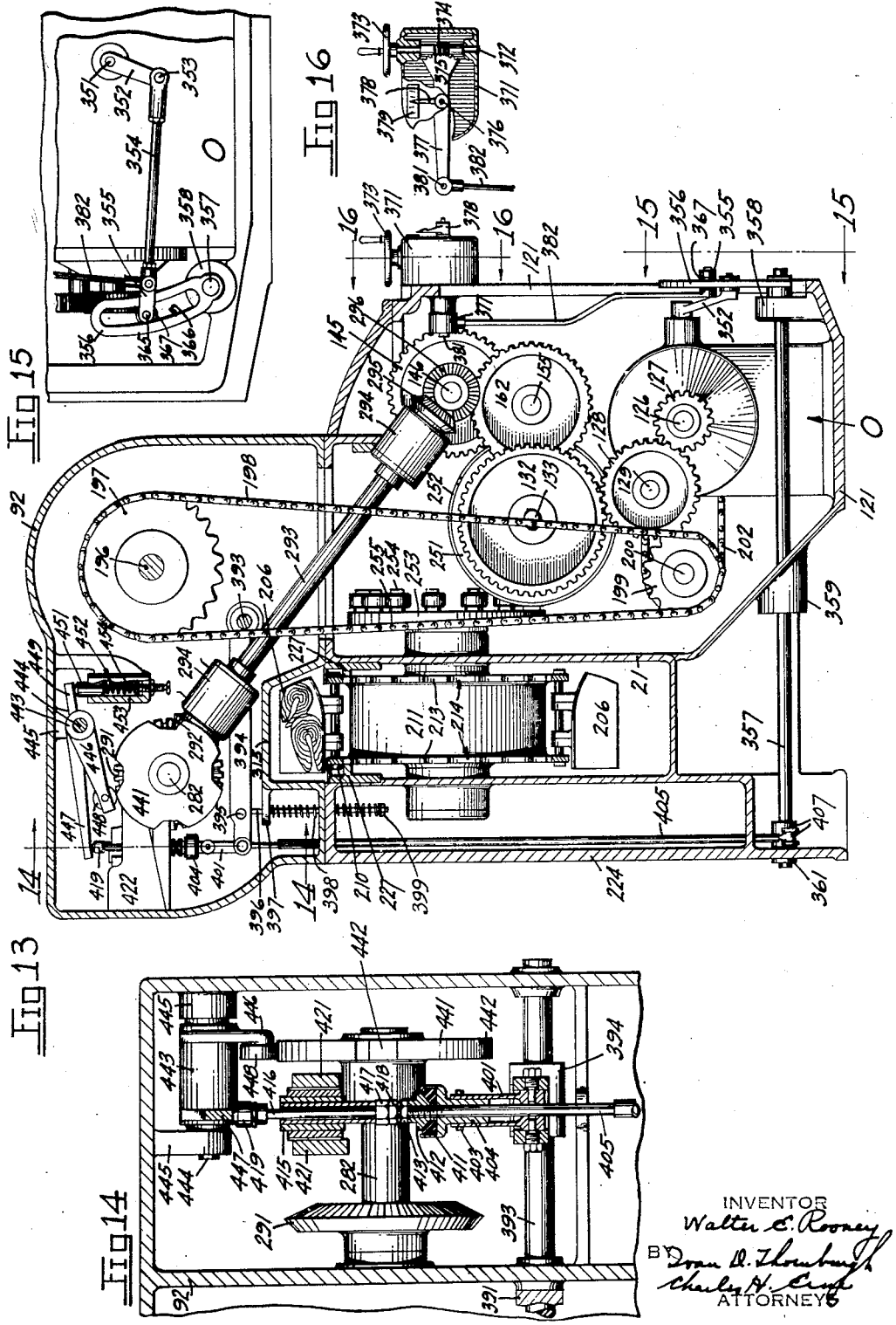

Dec. 24, 1940. W. E. ROONEY 2,226,019
FISH-CANNING MACHINE
Filed May 28, 1938 10 Sheets-Sheet 9
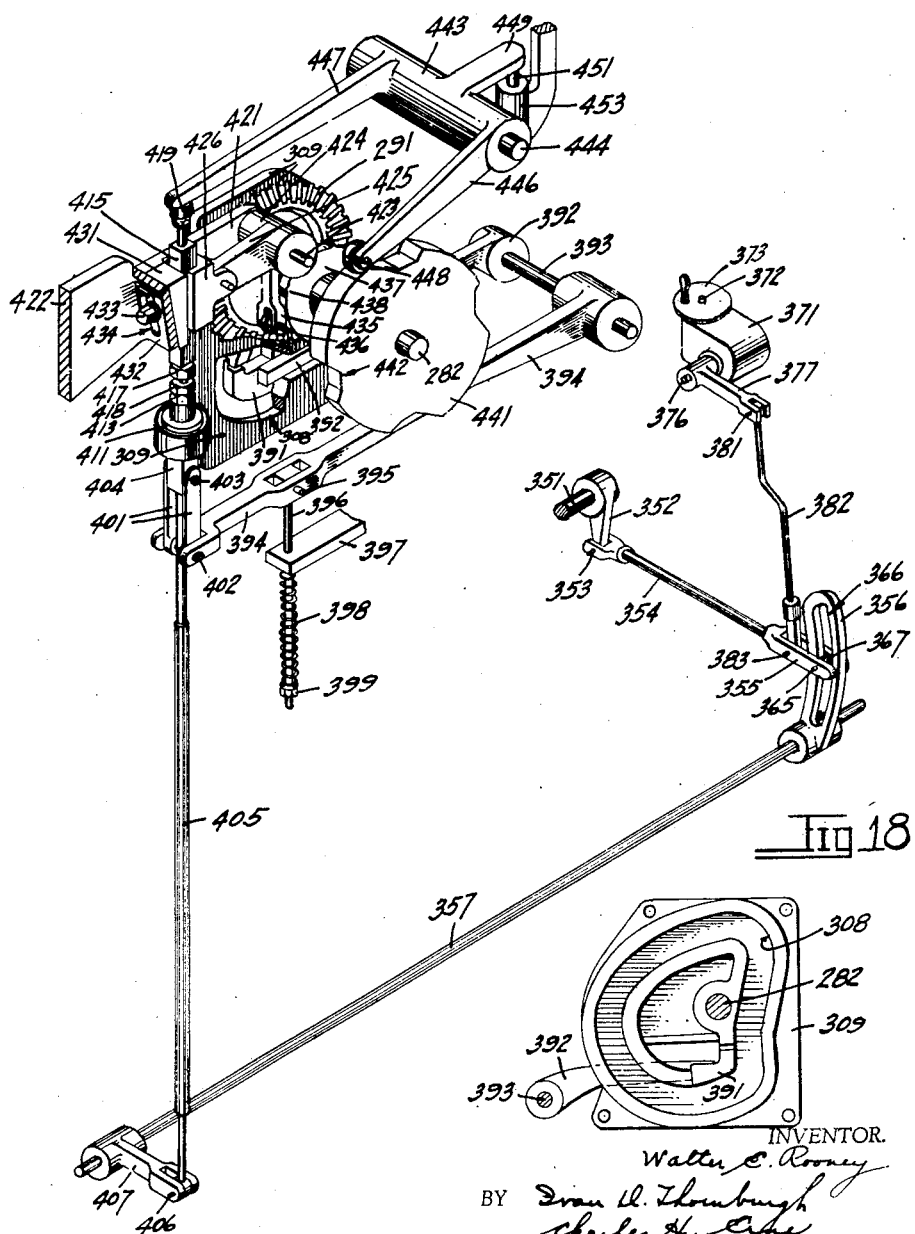

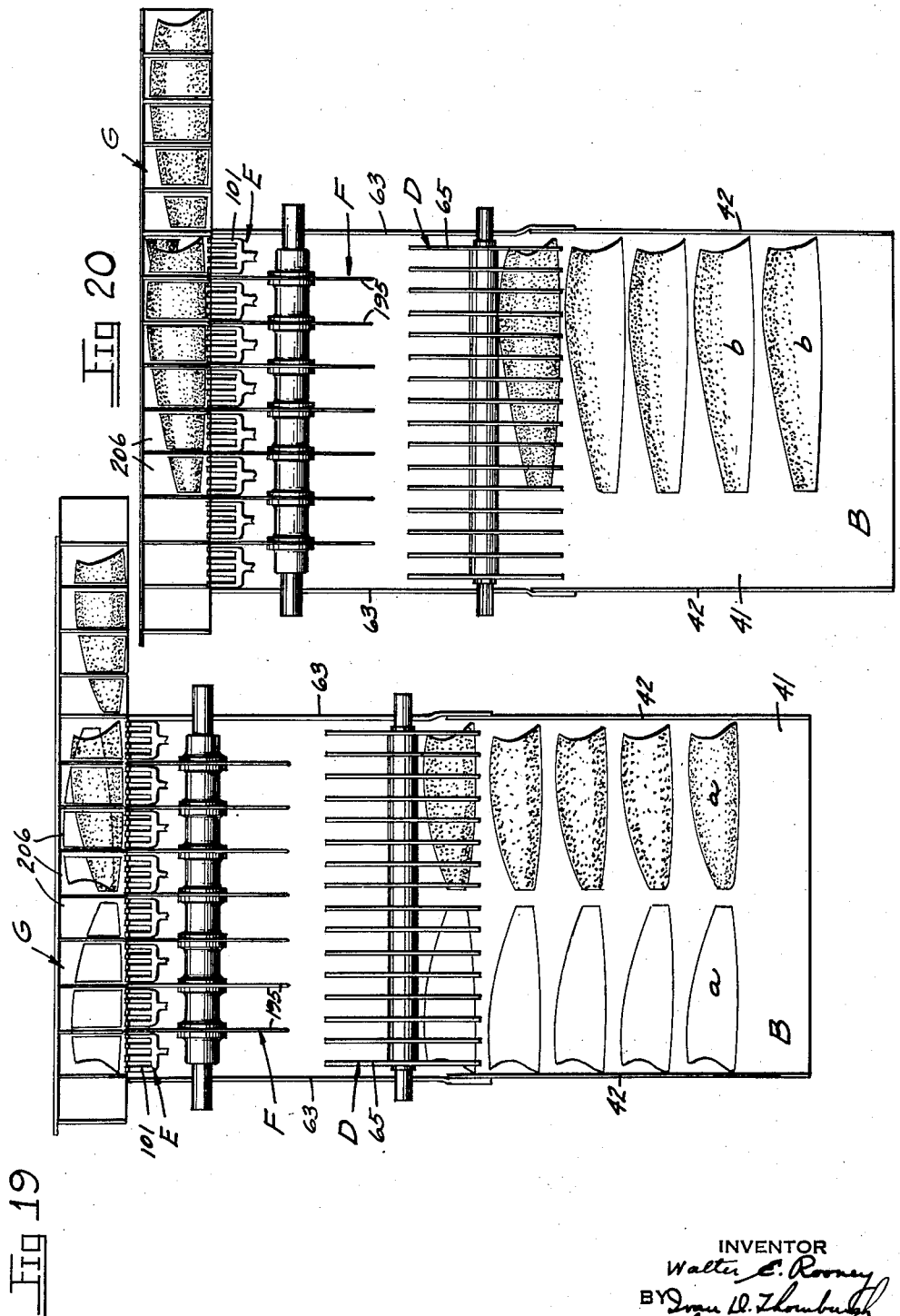

Patented Dec. 24, 1940

2,226,019

UNITED STATES PATENT OFFICE 2,226,019

FISH-CANNING MACHINE

Walter E. Rooney, Bellingham, Wash., assignor to American Can Company, New York, N. Y., a corporation of New Jersey Application May 28, 1938, Serial No. 210,764

21 Claims. (Cl. 17—4)

The present invention relates to fish canning machines and has particular reference to an apparatus for cutting whole fish into can lengths and further handling the cut pieces in preparation for packing into cans so that square cut and uniform length pieces are obtained, the invention providing an improved method of handling both the whole fish and the cut segments prior to and following the cutting operation, to the end that there will be an accumulation of just the desired number of cut pieces required for producing a mass of material held under a uniform compression, and providing a homogeneous, uniform filling supply for subsequent canning even though the individual fish in the mass may vary greatly in size.

In my Patent 2,044,813 issued by the United States Patent Office June 23, 1936, I have disclosed the feeding of a string of fish into a single cutter and into a restraining supply tunnel from which the fish pieces are continuously fed through a measuring device and thence charges of fish are filled into cans. In accordance with the present invention individual fish are passed through a plurality or gang of cutting elements and the cut pieces are collected in a supply tunnel preparatory to canning. During all of the stages of such treatment, advancement of the whole fish and of the cut fish is accelerated or is retarded in accordance with conditions obtaining at any particular moment in the restraining supply tunnel, to the end that more uniform can filling may be obtained.

The invention further contemplates a more uniform cutting action with a minimum of abrupt change of movement, some change of movement being necessary to control filling where the size of the individual fish received into the machine varies, more uniformity of machine operations as well as uniformity of can contents thus resulting.

An object of the present invention is the provision of an apparatus for cutting fish into can lengths and thence collecting the cut pieces in a restraining supply tunnel preparatory to canning, to provide a uniform fish mass which will be maintained at all times under a uniform pressure, although there is constant changing of component parts of the mass as a new supply of fish continually replaces that which is removed in the filling of the cans.

Another object of the invention is the provision of gang cutters in a machine of the character described to which the fish is fed and from which the fish is removed so that at no time is any part of the fish out of control.

Yet another object is the provision of an endless bucket conveyor for receiving the fish pieces as they are cut and for passing them into the supply tunnel only as required to maintain a predetermined compressed fish mass in the tunnel.

A further object is the provision of such an apparatus which includes fork members for placing cut fish lengths in a bucket conveyor and other elements for holding the fish in a bucket until the time for its removal and other fork members for removing the fish lengths from a bucket and for transferring the same to a supply tunnel, the latter fork members thereupon holding the fish in the tunnel under uniform compression without release of holding action at any stage of operation.

Another object of the invention is the provision of an apparatus for feeding individual fish of varying lengths and sizes through gang cutters and into movable conveyor buckets and synchronizing such feeding and movement of the buckets so that some of the conveyor buckets receive two smaller measures of fish while other buckets receive a single larger piece, thus more nearly unifying the contents of all buckets.

Still another object is the accurate control of movement of the various working parts in a machine of the character described to provide at all times a uniform mass of fish supply applicable for filling into cans.

Numerous other objects and advantages of the invention will be apparent as it is better understood from the following description, which, taken in connection with the accompanying drawings, discloses a preferred embodiment thereof.

Referring to the drawings:

Figure 1 is a perspective view of the fish machine embodying the present invention;

Fig. 2 is a vertical sectional view of part of the apparatus shown in Fig. 1, such a view being taken along the longitudinal course of travel of the fish in its passage through the cutting elements and into a conveyor bucket, the view also showing the fish being handled by the apparatus;

Fig. 3 is a vertical sectional fragment of some of the same parts shown in Fig. 2 and showing these parts and the fish in different positions;

Fig. 4 is a plan sectional view taken substantially along the broken line 4—4 in Fig. 2, parts being broken away;

Figs. 5 and 6 are sectional details taken substantially along the lines 5—5 and 6—6 in Fig. 4;

Fig. 7 is an enlarged vertical sectional view taken at the forward end of the longitudinal course of travel of the cut fish and showing the fish transferred from a conveyor bucket and deposited in the end of the supply tunnel;

Fig. 8 is a vertical sectional view showing some of the same parts as shown in Fig. 7 but taken at right angles thereto;

Fig. 9 is a rear elevation showing one end of the apparatus, this being the end in the rear of the showing in Fig. 1, part of the casing being broken back and shown in section;

Fig. 10 is an enlarged sectional detail of a clutch device shown in the lower central part of Fig. 9;

Fig. 11 is a vertical sectional view shown at a reduced scale and taken substantially along the broken section line 11—11 in Fig. 7, parts being broken away;

Fig. 12 is a plan sectional view taken substantially along the line 12—12 in Fig. 9, parts being broken away;

Fig. 13 is a vertical transverse sectional view taken substantially along the line 13—13 in Fig. 9;

Fig. 14 is a vertical sectional detail shown on an enlarged scale of parts taken along the section line 14—14 in Fig. 13;

Fig. 15 is a front elevation detail of a part of the apparatus shown in Fig. 13, the view being taken substantially from a plane indicated by the line 15—15 in Fig. 13;

Fig. 16 is a vertical sectional detail taken substantially along the line 16—16 in Fig. 13;

Fig. 17 is a perspective view of the speed control of the apparatus, parts being broken away and parts shown schematically;

Fig. 18 is a cam detail shown in elevation as it would appear if viewed along the line 18—18 in Fig. 8 but being at a smaller scale; and Figs. 19 and 20 are schematic plan views showing the table over which the fish is fed and further showing the course of travel of the fish through the gang cutter and into buckets of the bucket conveyor, Fig. 19 illustrating the feeding of relatively small fish through the apparatus, and Fig. 20 showing how larger fish are introduced advances beneath a fish receiving table B, the chain having flights which extend up through slots cut in the table and which engage behind the fish. At the forward end of the chain A the fish passes onto a grid unit C and is immediately picked up by a transfer fork unit D which sweeps the fish upwardly over the grid unit. During this movement the fish is engaged by a feeding fork unit E.

The gang cutters are designated broadly by the letter F and the fork elements which engage the fish, pass through and between the grids and between the cutter elements. In this way the fish is conveyed by the fork unit E over the grid unit C and through the gang cutters F during which time each fish is cut into can lengths.

While the cut fish pieces or segments are still under the control of the propelling action of the fork unit E these segments are deposited in a transverse bucket conveyor G. The bucket conveyor G is intermittently movable and when fish pieces are deposited in the conveyor the latter is at rest.

This feeding of the fish through gang cutters and the depositing of the same into a bucket conveyor is similar to the operation shown and described in the patent to Sullivan Number 1,655,581, dated January 10, 1928, although the handling of the fish both before and after cutting varies considerably as will be hereinafter more fully set forth.

The actuation of the feeding fork unit E is such as to hold the fish pieces in the conveyor buckets G, and while the fish pieces are so held a retaining gate member H cooperates with the fork unit as it moves downwardly on its path. This positively prevents any displacement of the fish pieces after they have been inserted into the bucket conveyor.

The restraining tunnel in which the fish mass is collected is designated by the numeral J and it is into the end of this tunnel that the cut pieces are collected. As already stated the subsequent operations of canning are fully set forth in my movable elements of the apparatus, the gangcutters continue under constant and uniform rotation.

The various working parts of the apparatus are supported by a main frame 21 (Fig. 1) which rests upon a base 22 having feet 23. The main frame 21 is formed in some places as a hollow housing and provides support for most of the working parts of the machine.

The fish receiving table B and the continuously operating chain conveyor A are located at one side of the main frame 21 as best shown in Figs. 1 and 2. A description of these parts will now be given.

Fish receiving table

The fish receiving table B is adapted to be hinged relative to the supporting frame 21 so that when not in use or when the machine is first shipped, the table may be folded down into a vertical position. The table is formed with a pair of side walls or supporting rails 25 which at the inner end of the table pass over and rest upon a transverse horizontal shaft 26. The two side rails 25 at their unhinged outer ends extend over a horizontal shaft 27.

The table is supported in a substantially horizontal position during operation of the machine by tie rods 28 (Figs. 1 and 2), the upper ends of the rods being bolted at 29 to the rails 25. The lower end of each tie rod 28 is pivotally anchored in a bracket 30 which is secured to and extends out from the base 22. When the fish receiving table B is not in use the connections 29 of the rods 28 are disconnected from the rails 25. This permits swinging of the rails and all parts of the fish receiving table B into a vertical non-operating position. The tie rods 28 at such time may be swung out of the way into a position most convenient.

The chain conveyor A consists of a pair of spaced endless chains 31 (see also Fig. 4), the chains being located just inside of the side rails 25. Each chain at the machine end of the table B passes over and is operated by a sprocket 32 which is secured to the shaft 26. At the opposite end of the fish receiving table each chain 31 passes over an idler sprocket 33 secured to or mounted on the shaft 27. Cross bars 35 are carried by the chains 31 and each bar supports a series of flights 36 which provide for engagement of fish to be fed into the machine.

A fish trough table section is provided for the reception of the fish placed into the fish receiving table B and this section extends over the chains 31. The trough section is formed with a horizontal floor plate 41 and side walls 42 and is held between the rails 25. In this manner the rails 25 provide support for the table parts 41, 42.

The plate 41 is slotted in a plurality of longitudinally extending slots 43 which terminate short of the outer edge of the plate. The slots provide clearance for the chain flights 36, which, when moving on the upper run of the chain, extend above the surface of the table plate 41 as clearly illustrated in Figs. 1 and 2.

In the graphic showing of Figs. 19 and 20 the relative positions of individual fish fed into the machine are indicated. The fish are placed on the table plate 41 in a transverse position and this may be done by hand or in other suitable manner. The individual fish are engaged by a set of the chain flights 36, the spacing between adjacent fish being determined by the distance between sets of flights 36 on adjacent bars 35 of the chains 31.

When the fish are small, as illustrated in Fig. 19, two fish are placed on the table plate 14 in a line with the larger or head ends outwardly or next to the side walls 42. The right hand fish is shown in a way to distinguish it from the companion fish on the left to more clearly illustrate a feature of handling after cutting as will be explained hereinafter.

When the fish are large, as shown in Fig. 20, there is only one fish in each line and all fish are placed with the larger or head end toward the right hand wall 42 as viewed in this figure. Both Fig. 19 and Fig. 20 are schematic only and the chain parts, table slots and other details have been eliminated. It will be understood that the chain flights 36, in engaging the individual fish, keep the proper spacing between fish.

The shaft 26 is journaled in brackets 51 (Fig. 2) which are secured directly to the frame 21. These brackets are preferably joined together by a transverse web 52. A floor plate 53 (Figs. 2 and 4) is mounted on and secured to the brackets 51 and along one edge to the web 52. This plate extends across the width of the fish receiving table B.

The floor plate 53 is bent upwardly to project over the sprocket 32 and over the chains 31 and extends under the table plate 41. Plate 53 is slotted at 55 and these slots correspond to the slots 43 of the table plate. The slots 55 provide clearance for the chain flights 36 as they move down over the front sprockets and as they pass below the surface of the table. The inner end of the slotted table plate 41 thus rests directly on top of the free edge of the plate 53 as best shown in Fig. 2 and this provides a smooth floor over which the fish pass. This construction also allows for the swinging of the table B into its non-operating position, at which time the forward slotted edges of the table plate 41 slide over and move away from the slotted edge of the floor plate 53.

The grid unit C is composed of a series of grid bars 61 (Figs. 2 and 4). At one end (right as in Fig. 2) the bars are preferably joined as an integral part of a solid edge wall 62 which may be mounted on and secured to the cross web 52. At the opposite end the bars are supported on a track frame of the bucket conveyor G. Side plates 63 are supported on the frame and these align with the side walls 42 of the table B. The grid bars 61 are substantially S-shape in profile as illustrated in Fig. 2 and this provides a raised central section over which the fish are lifted when passing through the gang cutters F.

Tranfer fork unit

When the fish being moved by the conveyor chains 31 come to the inner end of the fish receiving table B, an individual fish in the case of large fish being handled, as exemplified in Fig. 20, or two smaller fish in line as suggested by Fig. 19, are passed onto the floor plate 53. The set of chain flights 36 which engage such fish thereupon pass down through the slots 55 of the floor plate and disappear as they move around to the lower run of the conveyor chains. It is at this position that the fish is engaged by the transfer fork unit D.

Transfer fork unit D comprises a series of double prong forks 65 (Figs. 1 and 2). The two fork prongs are joined at the center in a hub 66 which is adapted to be mounted upon and carried by a transverse shaft 67 which extends across and above the floor plate 53 and the grid unit C.

The hub 66 of each double fork unit insures proper spacing of adjacent units and the fork prongs are aligned to provide two diametrically opposed fork sweeps as best illustrated in Fig. 1.

The shaft 67 is mounted for rotation in suitable bearings. At one side the bearing is in a bracket 68 carried on the main frame 21 and at the other side in a housing 69 also supported on the main frame. One end of the shaft 26 also extends through the housing 69 and the transfer fork unit D is synchronised in movement with the chain conveyor A by suitable gearing. This insures that each set or sweep of prongs of the transverse fork unit passes in behind the line of chain flights 36 so that the individual fish are properly handled.

A gear 71 is mounted upon the end of the shaft 67 and meshes with a similar gear 72 secured to the end of the shaft 26. Actuation of the driving mechanism for the shafts 26, 67 will be referred to hereinafter.

The transfer forks 65 move the fish away from the floor plate 53 and sweep it over the lower ends of the grid bars 61 of the grid unit C, and the feeding fork unit E passes in behind the transfer fork and picks up the fish. Consideration will now be given to the construction of the feeding fork unit E.

Feeding fork unit

The feeding fork unit E comprises a series of individual forks (Figs. 2 and 4). As illustrated in the drawings there are six middle fork units 81 of the same construction and two outer fork units 82 of slightly different construction. The middle fork units have hubs 83 and the two side forks have hubs 84. All of the hubs are mounted side by side upon a transverse rock shaft 85.

The ends of the shaft 85 are journalled in bearings 86 formed in the outer ends of radially disposed boss sections 87 of gears 88. There are two gears 88, one at each side of the machine. One gear is mounted upon a stub shaft 89 which extends into a hub bearing 91 formed in the side wall of a housing section 92 which may be a part of the main frame 21. The gear 88 on the opposite side of the machine is mounted on a short shaft 95 which is journalled in a hub 96 formed in a housing section 97 of the main frame 21.

Provision is made for rotating both shafts 89, 95 in unison so that the gears 88 during a complete rotation will carry the shaft 85 in a circular path (counter clockwise as to Fig. 2). The fork units mounted thereon are correspondingly moved but in addition the shaft and the units are rocked on the shaft center, i. e., in the bearings 86, to produce the desired feeding movement. It is with this controlled feeding action that the fish is carried through the gang cutters F and is deposited into the transfer bucket conveyor G by the feeding fork unit E. This will be more fully understood as the description proceeds.

Each fork 81 or 82 is provided with a fork prong head 101. All of the heads are alike in construction and the individual forks are disposed relative to each other so that there is presented a line of equally spaced prongs. Each prong is adapted to pass into and through a space between adjacent grid bars 61 during such transfer of the fish.

Each of the outer fork hubs 84 is integral with a depending lever arm 105 (Figs. 2 and 4) the lower end of which carries a pivot pin 106. Each pivot pin 106 provides for a connection with a connecting rod 107, the other end of the rod being pivotally connected at 108 to the lower end of a depending lever 109.

The two levers 109 are independently mounted upon individual short rock shafts 111. One rock shaft 111 is mounted in a hub 112 formed in the housing wall 92 of the frame and the other rock shaft is carried in a similar hub 113 formed in the housing 97. The levers 109 are moved in unison by cam means and are swung back and forth, pivoting about the axis of the rock shafts 111 while the fork supporting shaft 85 moves around in its circular travel.

During the travel of the fish up and over the inclined course of the grid bars 61 and while resting against the fork heads 101, the fish is held down on the grid as it passes under top support spring plates 115 (Fig. 2). Each plate 115 is mounted at one end to a transverse supporting bar 116 which is secured on one side to the housing 92 and at the opposite end to the housing 97. This constitutes an anchorage for the spring plates and the free ends of the plates are turned up to permit easy insertion of the fish being swept forward by the feeding fork unit E.

Consideration will now be given to the actuation of the feeding forks 81, 82 and to the cam movement of the levers 109. Actuation of the transfer fork unit D will also be noted and the manner of driving the chain conveyor A.

"Oilgear" drive mechanism

All of the moving parts of the apparatus except the gang cutters F receive actuation through a gear reduction element known under the trade name "Oilgear". Driving power is applied to an input shaft associated with such a gear reduction unit and within the unit may be a series of reduction elements which actuate an output shaft. It is this output shaft that indirectly controls all of the operating parts of the apparatus, excepting the gang cutters, and these in their turn are driven by association with the input shaft and are therefore not subjected to any gear reduction.

Such an "Oilgear" is designated in the drawings by the letter O (Figs. 9 and 13) and is mounted upon the base of a housing 121 which may be a part of the housing 92. The "Oilgear" O receives power through a drive shaft 122, this being the input shaft already mentioned. Shaft 122 is mounted in a bearing 123 formed in the housing 121 and may in turn be driven by belt connection 124 with any suitable power source or prime mover. Belt 124 operates a drive pulley 125 mounted on the end of the shaft.

The output or driven shaft of the "Oilgear" is designated by the numeral 126. It preferably extends from the "Oilgear" on the opposite side and it is this shaft 126 (see also Figs. 12 and 13) which provides the main driving reduction connection for the actuating parts of the machine excepting the gang cutters F.

Any suitable form of "Oilgear" may be employed for this purpose, there being a number of commercially manufactured gear reduction mechanisms which are referred to by different descriptive names but which operate to provide a controlled output of driving power at a reduced speed. Such an "Oilgear" unit O may be of the type illustrated in the W. Ferris Patent 2,074,068, granted March 16, 1937.

The shaft 126 (Figs. 9, 12 and 13) carries a gear 127 which meshes with a gear 128 carried on a short shaft 129 journalled in a bearing 131 formed in the housing 92. The shaft 129 is merely an idler shaft and the gear 128 also meshes with a larger gear 132 which is mounted on one end of a horizontally disposed cam shaft 133. The shaft 133 is journalled in a bearing 134 formed on a bracket 135 which is an integral part of the frame 121 and in a bearing 136 carried in a bearing plate 137 mounted upon and extending into the housing 121.

The shaft 133 also carries a gear 141 which meshes with a gear 142 mounted on a short stub shaft 143 journalled in a bearing 144 formed in the bearing plate 137. The gear 142 also meshes with a relatively large gear 145 which is secured to one end of a clutch drive shaft 146. The shaft 146 is journalled in a bearing 147 formed in a bracket 148 extending into and forming an integral part of the housing 92.

A gear sleeve 151 is keyed to the shaft 146 and the opposite ends of the sleeve are formed with teeth which constitute drive gears 152 and 153. Gears 152, 153 are of different diameters and provide for a selective gear transmission through a clutch device P (Figs. 9, 10 and 12). The particular selection of gear speed used will depend upon whether a large or small fish is being handled, as will be later more fully explained. It may be mentioned, however, that when small fish are being handled in the machine, as exemplified in Fig. 19, the driving force for the moving parts is effected through the gear 152. When the larger fish (Fig. 20) are handled the drive is through the gear 153.

Clutch device P is illustrated in detail in Fig. 10 and is mounted upon an operating shaft 155 which is located below and parallel to the clutch drive shaft 146. This operating shaft 155 is journalled in a bearing 156 formed in the end of the bracket 148 (Fig. 9) and in bearings 157 (see also Fig. 4) formed in the housings 121 and 97.

A driving sleeve 161 is keyed on the end of the shaft 155 which is adjacent the bearing 148. This sleeve is reduced at its ends and on the ends of the sleeve are mounted gears 162 and 163 which respectively mesh at all times with gears 152, 153. Both gears 162, 163 are loosely mounted on the sleeve and are constantly rotated by the driving gears 152, 153 but at different speeds owing to the different gear ratio between the gear set 152, 162 and the set 153, 163.

It is by reason of the clutch that one or the other of the gears 162, 163 is connected in driving relationship with the sleeve 161 and the operating shaft 155. The shift part of the clutch unit comprises a sliding collar 165 which is mounted on the central part of the sleeve 161 and this collar at all times rotates with the sleeve, being connected therewith by a feather 166.

The clutch collar 165 is adapted to slide on the sleeve and has three positions. In the position shown in Fig. 10 the clutch is in neutral, that is, it is in between the gears 162, 163 and has no driving connection with them. When in this neutral position the collar 165, sleeve 161 and shaft 155 are stationary and all the parts driven through the shaft are at rest. The two gears 162, 163, however, are continuously rotating on the sleeve, being driven by the gears 152, 153.

The clutch collar 165 is formed with clutch teeth 168, 169 cut in the opposite faces of the collar. The gear 162 is also formed with clutch teeth 171 and when the clutch collar 165 is in its second position, which is toward the left (Fig. 10), its teeth 168 engage with the teeth 171 of the gear 162. This connects the gear with the shaft 155 so that the shaft is rotated at the rate of speed effected by the gear ratio 152, 162. The gear 163 is also provided with clutch teeth 172 and when the clutch collar 165 is in its third position, which is toward the right (Fig. 10), its teeth 169 engage with the teeth 172 of the gear 163. When so connected the shaft 155 rotates at the speed occasioned by the gear ratio 153, 163.

The collar 165 may be shifted laterally into one of its three positions by a lever 175 (see also Fig. 12) which may be manually controlled from outside the machine housing. The lever 175 carries a pin 176 on which is mounted a roller 177 which engages within a peripheral groove 178 formed in the clutch collar 165.

The shaft 155 at the end opposite the clutch device P carries a gear 181 (Figs. 1, 4 and 5), which is located outside of the machine housing 121 and inside of the housing 69. This gear meshes with a similar gear 182 secured on a short stub shaft 183 journalled in the side frame wall in the housing 69. A sprocket 184 is also mounted on the shaft 183 adjacent the gear 182 and a chain 185 operates over the sprocket 184 and also over a sprocket 186 mounted on the shaft 26. The rotating shaft 155 is thus effective in driving the chain 31 by means of which the conveyor chain unit A is moved. The shaft 26 being thus rotated, its gear 72 meshing with the gear 71 on the shaft 67, effects rotation of that shaft and the transfer fork 65.

The rotating shaft 155 also carries a pair of combination cam gears 191 (Figs. 2, 3 and 4) one on each side of the machine. Each cam gear 191 meshes with a corresponding gear 88 of the feed fork mechanism E. The gears 191 being rotated in unison with the shaft 155 and each driving a gear 88, the connecting shaft 85, carrying all of the feeding forks 81, is carried in its circular travel as already referred to.

A cam groove 192 is cut on the inner face of each of the cam gears 191 and a cam roller 193 is carried on each lever 109, being mounted upon a pin 194 carried in the arm. Such a roller, operating within the cam groove 192 during the rotation of the gear 191, swings the lever 109 on its pivotal axis 111 so that the two fork arms 105 are moved in unison.

This oscillates the fork shaft 85 on its own center and all of the fork heads 101 are correspondingly moved in addition to being bodily carried in their circular path. Like the movement of the chain conveyor A, this speed of movement of the feed fork heads 101 is timed in accordance with the gear ratio which is in driving effect, in accordance with the position of the clutch arm 175 of the clutch device P.

The gang cutters F (Figs. 1, 2 and 9) comprise spaced discs 195 the outer edges of which may be bevelled to provide a sharp cutting edge. All of the discs are mounted upon a shaft 196 (see also Fig. 13) which is journalled in suitable bearings formed in the frame parts 92, 97. A sprocket 197 is secured on one end of the shaft this being inside of the housing 92. A drive chain 198 operates over the sprocket and at the lower end passes over a sprocket 199 which is secured on a transverse shaft 200. The shaft 200 (Figs. 12 and 13) is journalled in bearings 201 formed in the housing 121.

A sprocket chain 202 operates over a sprocket 203 mounted on the end of the shaft 200 opposite to the sprocket 199. This chain also operates over a sprocket 204 (see also Fig. 9) which is mounted directly on the input shaft 122. It will be recalled that the shaft 122 is continuously operated and is not effected by the reduction of the "Oilgear" unit O. Through the described train of sprocket and chain connections the gang cutting discs 195 are continuously rotated to perform the severing of the fish as the latter is passed through them by the feeding fork heads 101.

*Bucket conveyor G*

After the fish has been severed by passage through the gang cutters F, the pieces are deposited into the bucket conveyor G as has already been mentioned. This conveyor which is located beyond the gang cutter discs 195 at the discharge end of the grid unit C, comprises an endless chain conveyor which consists of links 205 (Figs. 7 and 8), each link comprising a single bucket unit 206. Each bucket unit carries a front wall 207 and a floor 208 and each front wall thus provides a division wall between adjacent buckets.

Each link 205 is pivotally connected at its end to two adjacent cross shafts 209 and two rollers 210 are rotatably mounted on each shaft one at each end. The chain conveyor at one side of the machine (which is toward the right as viewed in Figs. 1 and 4), passes over a drum sprocket 211 (Figs. 7 and 8) which is mounted on and keyed to a horizontal drive shaft 212. This drum sprocket has projecting flanges 213 formed on both sides which are notched out as at 214 to provide sprocket pockets for the chain rollers 210.

At the opposite side of the machine the chain conveyor passes over a similar drum sprocket 221 (Fig. 1) which is also formed with side flanges 222 having sprocket pockets 223 for the reception of the chain rollers 210. Sprocket 221 is mounted upon an idler shaft which is similar to the drive shaft 212.

The bucket conveyor G operates in a housing 224 (see also Fig. 7) which may be an integral part of the main frame 21. The shaft 212 is journalled in a bearing 225 formed in the housing and in a bearing 226 formed in the housing 121. In like manner the idler shaft for the sprocket 221 has bearing engagement in the frame parts 224 and 121.

The upper run of the bucket conveyor is maintained in a straight horizontal line between the sprockets 211, 221 by side rails 227 (Figs. 2, 8 and 13), which form tracks for the chain rollers 210. These rails are bolted to the respective frame parts 121, 224 on each side of the bucket conveyor G.

The buckets 206 which are to receive the cut fish pieces, are on the upper run of the conveyor chain and are at such time disposed intermediate the sprockets 211, 221. Such buckets are then in a straight line, the rollers 210 for these buckets resting upon the rail tracks 227. It will be understood that the spacing between adjacent gang cutters 195 is the same as the spacing between adjacent bucket walls 207 and that there will be a pocket 206 at the end of the path of travel of each cut section of fish.

The floor 208 of each bucket 206 is inclined upwardly at 231 in a curve, as illustrated in Figs. 2 and 7, and this curved floor provides a continuation of the curved top of the grid bars 61 over which the cut pieces of fish are swept by each fork head 101. The combined rotating and cam movements of the feeding fork unit E are such as to hold the cut piece or pieces of fish section in each bucket as the fork moves down for its return movement.

Fig. 3 illustrates the fork in partially lowered position and just ready to return back to its point of beginning. The combination of cam and crank movements resulting from the circular motion of the shaft 85 and the oscillating movement of the lever arms 109 and 105, is designed to help prevent any particles of the fish from escaping from the bucket and from following back with the receding fork head.

The end of each bucket opposite the entrance end is blocked off by a stationary back wall 232 (Figs. 2 and 3). This wall extends across the upper run of the conveyor G and is mounted upon a pair of support arms 233 fixed at 234 to the frame 224. A cover plate 235 is also carried by the arms 233 and is substantially coextensive with the back wall. At the entrance ends of the conveyor buckets the cover plate is bent upwardly at 236 to permit easy passage of the fish to the buckets.

Spring guide trips 237 hold the cut pieces of fish down on the grid bars during the passage from the gang cutters 195 to the buckets. The guide strips are anchored at one end on the bar 116 and they extend between the cutters 195.

After the conveyor buckets 206 have been filled with their charges of fish, they move along the side of the wall 232 and beneath the plate 235, this movement being intermittent and each step movement being equal to the space between adjacent buckets. A new charge of fish is not again fed to the bucket conveyor until certain of the buckets have been emptied of a preceding charge. This will be better understood as the description proceeds. The walls 232, 235 thus block off the bucket conveyor pockets and prevent any loss of the fish during its transfer.

The retaining gate member H which cooperates with the fork unit to prevent the fish from pressing out of a bucket 206 after being deposited there by a fork head 101, consists of a curved plate 238 which is carried on a pair of right angled arms 239 mounted on a rock shaft 240 which is journalled in bearings 241 formed in the housing 224.

Rock shaft 240 oscillates to hold the plate 238 in raised position to permit unobstructed filling of the conveyor buckets 206 and is then moved down following closely the fork heads 101 as the fork unit E moves back and downward on its path. The plate 238 remains in lowered position blocking off any inadvertent discharge of fish from the conveyor buckets during the time the conveyor is moving to bring each bucket into position for discharge of the fish.

Consideration will now be given to the actuation of the chain conveyor G by which the same is intermittently moved, after which actuation of the retaining gate member H will be considered.

The cam shaft 133 (Figs. 9, 12 and 13) carries an actuating Geneva drum 251 on which two or more helical threads 252 are disposed. The periphery of the drum 251 passes adjacent to the face of a Geneva disc 253 (see also Fig. 7). This disc is mounted on one end of the shaft 212 just inside the housing 121 and adjacent the bearing 226.

The Geneva disc 253 carries a series of pins 254 and Geneva rollers 255 are rotatably mounted upon the pins. As the Geneva drum 251 rotates with the shaft 133, its thread 252 at all times is disposed between two Geneva rollers 255. The incline of the threads 252 acting on the enclosed roller is such as to effect a partial rotation of the Geneva disc 253 moving the shaft 212 and the conveyor G a distance which will move the buckets of the latter just one bucket space. Following such movement the incline of the threads 252 changes so that the engaged Geneva roller 255 is held stationary. Then the conveyor is at rest. Following the rest period the next adjacent Geneva roller 255 is engaged and the cycle of movement and rest is repeated.

It will be observed that the intermittent advance of the conveyor G is not effected through the clutch device P. The shaft 133 on which the Geneva drum 251 is mounted is closer to the "Oilgear" drive shaft 126 in the train of gearing, and the conveyor G continues operation even though the clutch collar 165 is in neutral position with its operated shaft 155 of the clutch device at rest.

It may here be repeated that the operation of the chain conveyor A and the operation of the transfer fork unit D and feeding fork unit E are all brought about through the clutch device P. The retaining gate member H is also operated through connection with the clutch device P. The actuation of the gate member will now be described.

The shaft 95 on which one of the feeding fork gears 88 is mounted carries a cam 261 (Figs. 1, 4 and 6). This cam is keyed on the end of the shaft opposite to the gear and is outside of the housing 97. Cam 261 is formed on its inner face with a cam groove 262 and a rocker lever 263 is disposed inside of the inner wall of the cam. Lever 263 is mounted on a stud 264 which is carried in the housing 97 of the main frame.

The lower end of the lever 263 carries a cam roller 266 which operates in the cam groove 262 and one complete rotation of the cam makes one complete oscillation of the lever. The upper end of the lever 263 (see also Fig. 3) is pivotally connected by a connecting rod 267 to the upper end of an arm 268 which is mounted on and secured to the rock shaft 240. The effect of the cam 261 is to lift the curved plate 238 just in time to permit the feeding of cut fish pieces into the several positioned buckets 206 of the bucket conveyor G.

After the fish has been put into the buckets, the plate 238 is brought down to close off the entrance side of the buckets and in this downward movement the plate follows the receding forks 101 of the feed fork unit E. As will be observed by reference to Fig. 6, the cam track contour for lifting of the plate and lowering it, constitutes a relatively short period of time and most of the cam cycle is for holding the plate 238 in its lowered position. This corresponds to the time the filled buckets 206 are being intermittently advanced.

*Change for fish size*

In further consideration of the action of the conveyor chain A, the transfer forks D and the feeding forks E, as well as the retaining plate H, all of which receive motion through the clutch device P, reference should be had to Figs. 19 and 20. The drawings illustrate a gang cutter consisting of seven cutting discs 195 and this size of cutter is used where standard one-pound tall salmon cans are being packed. Obviously the number of cutting discs will depend entirely upon the conditions of canning and the size of the can.

The drawings also illustrate a common fish size for the salmon industry, Fig. 19 illustrating the feeding of small salmon and Fig. 20 the feeding of the larger size of fish. These different conditions are given by way of an example.

Where the smaller size fish is being canned, the dressed fish bodies a (Fig. 19) are placed on the table plate 41 of the receiving table B in pairs with the head of the body of the right hand fish toward the right and the head of the body of the left hand fish toward the left. In other words, two aligned fish are faced in opposite directions. One set of chain lugs 36 thereupon moves the two aligned fish together and while still in alignment. In this manner the two fish are passed through the cutting discs 195. These two fish are accordingly cut into eight sections or pieces, each cut being advanced into the waiting buckets 206 by the fork heads 101 as has already been fully described.

The fish a being small, a single cut section does not sufficiently fill the bucket 206 and provision is made for putting two pieces in the same bucket. For small fish, therefore, the timing of the conveyor chain A, transfer forks D, feeding forks E and retaining plate H is established through the clutch device P, so that the bucket conveyor G moves through four intermittent steps only and then the next pair of fish, after being cut, is brought into the buckets then positioned in front of the feed fork heads 101.

The effect of such a timing is to move the buckets containing the right hand fish of the first cut beyond the receiving position. The four buckets containing the pieces of the left hand fish of the first cut are then still in receiving position but on the right side, and in this position the four cut pieces of the right hand fish of the next pair being advanced by the feed forks, pass into the same partially filled four buckets.

Since the left hand fish which was first in the buckets is faced with the tail end toward the right, the incoming fish sections on the right face in the opposite direction. In other words, the head of one fish will be in the same bucket as the tail of the other fish. This results in a more even filling of the buckets and it will be obvious that after the machine has once been started, all of the buckets will each receive two cut pieces of fish coming from two subsequently cut individual fish.

This lifting of the retaining plate 238 and the simultaneous feeding of fish into the bucket conveyor G after each four intermittent advancements, is the result of the setting of the clutch device P. When the clutch collar 165 (Fig. 10) is shifted toward the left to connect the gears 152, 162 with the operating shaft 155, this four-step interval is effective.

Where the larger fish are being handled a different setting of the clutch device P is made. In that case the clutch collar 165 is moved toward the right to bring the gears 153, 163 into action for moving the operating shaft 155. The conveyor chain A, transfer forks D and the feeding forks E then present a new fish as the retaining plate 238 moves up, this time after five set movements of the bucket conveyor G.

The larger size fish are indicated by the letter b in Fig. 20. In this case the head end of the fish is placed toward the right and adjacent the right hand plate wall 42 of the receiving table B. This fish as illustrated in the drawings does not extend through a sufficient space to be engaged by all of the cutting discs 195. The particular size illustrated is of a length to be severed into six pieces, the five right hand cutting discs 195 doing this work. Six cut pieces are therefore deposited in the waiting conveyor buckets 206.

Then follows advancement of the bucket conveyor G through five intermittent steps. Since the fish has been severed into six pieces it will be obvious that the tail or last cut of the fish is not moved beyond the receiving position when the next fish is fed through the cutters and its pieces are deposited into the waiting buckets 206. The result of this is that the tail piece of the first fish occupies the first of the buckets receiving the following cut fish. One bucket therefore contains a head end cut and a tail cut. This results in a more uniform filling of the buckets.

It will be obvious that if the fish extends yet further so that it is cut in seven pieces, two tail cuts would then be located in buckets which later receive a subsequent charge of fish pieces. The effect of this construction is to prevent passing of a conveyor bucket 206 which only contains a cut piece of fish too small for uniform filling purposes. It is believed that these two illustrations of different ways of handling two sizes of fish will suggest how variations in fish size can be handled.

*Bucket discharge of fish to restraining tunnel*

At each of the rest periods of the bucket conveyor G a filled bucket 206 is positioned adjacent the end of the restraining tunnel J. Consideration will now be given to the discharge fork unit K which is utilized for transferring the cut fish from the conveyor buckets.

The discharge fork unit K comprises a fork head 275 (Figs. 7 and 8). There are four units illustrated in the drawings, each fork head being an integral part of a hub section 276 which is carried on a pin 277 of a crank 278, the latter being formed as a part of a shaft 279. Each shaft 279 is rotatably mounted in and is carried by a rotatable disc 281.

The disc 281 is keyed adjacent one end of a horizontal shaft 282 which is journalled at that end in a bearing 283 formed in a housing cap 284. The bearing cap 284 is mounted on the frame of the machine. Intermediate the ends of the shaft 282, a bearing 285, carried in the housing section 92, provides further support for the shaft.

The housing cap 284 joins with a housing shell 286 which encloses the rotatable disc 281 and an auxiliary housing 287 (Figs. 7 and 9) is mounted on the frame adjacent the shell 286. This auxiliary housing encloses the lower part of the chamber in which the discharge fork unit K is located. A hinged cover 288 (see also Fig. 8) is hinged at 289 on the housing 287 and this provides a closure for the upper part of the chamber. By reason of the hinged connection the cover member 288 may be lifted out of place and easy access may be had to the fork unit K.

The shaft 282 is rotated by connection with the shaft 146 in the following manner. A bevel gear 291 (Figs. 8, 11 and 13) is mounted on the shaft 282. This gear meshes with a bevel pinion 292 which is carried on the upper end of an inclined shaft 293, journalled in bearings 294, carried in the frame sections 92, 121 of the machine. The lower end of the shaft 293 carries a bevel gear 295 which meshes with a corresponding gear 296 mounted on the shaft 146 (see also Fig. 9). Since the shaft 146 is not affected by the clutch device P it wil be obvious that the setting of the clutch will have no effect upon the rotation of the shaft 282 and the disc 281.

Each shaft 279 (Figs. 7 and 8) carries a gear 301 which at all times is in mesh with an internal ring gear 302 carried in the frame 92 and in the housing parts 284, and 286. The disc 281 as it turns with the shaft 282, carries the four crank shafts 279 and the four gears 301 in a circular path of travel and the latter, meshing with the internal gear 302, impart a constant uniform rotation to the cranks 278. By reason of the eccentric mountings of each crank pin 277 it is a caused to move with a planetary motion. This raises and lowers the fork center as the fork moves on its orbit.

Each hub section 276 of the fork unit is projected outwardly at one side in an arm 305 (Figs. 7 and 8) and each arm carries a pin 306 on which is mounted a cam roller 307. Each cam roller 307 operates in a cam groove 308 cut in a stationary cam 309 (see Figs. 17 and 18). The cam 309 is bolted to a wall of the housing 92, the cam surrounding the shaft 282.

By reason of the cam track 308, together with the rotative and planetary wobble of the fork hubs 276, the fork head 275 of each unit is caused to properly engage all of the fish located in the bucket 206 which at the time is in discharge position. In this way the fish is removed from the bucket conveyor and forced into the restraining tunnel J.

As illustrated in Fig. 13, part of the housing 92 is formed as an archway 315 and through this archway the filled buckets 206 of the conveyor G successively pass as they advance to the discharge position. The discharge position for each bucket is directly opposite the restraining tunnel J (Figs. 7 and 8) and this is just ahead of the archway 315. The bucket 206 in coming into place, passes beneath a grid 316 the lower surface of which is flush with the under surface of the arch 315.

Grid 316 is fastened to the housing 287 and is directly beneath the discharge fork unit K. The fork head 275 moves into that end of the bucket through which the cut fish entered and sweeps along close to the inclined floor section 231 of the bucket and then along the bucket floor 208. This action crowds the fish toward the left as viewed in Fig. 7 as the fork prongs pass through the slots of the grid 316.

The restraining tunnel J comprises a laterally extending tubular casing 321, the machine end of which rests on and connects with the top of the housing 224. An insert U-shaped wall part 322 is also mounted on top of the housing 224 and is interposed between the end of the tunnel section 321 and the positioned bucket 206 from which the fish is being discharged by the fork head 275.

It will be understood that each time a bucket filled with fish sections comes to rest at the discharge position, the fork head 275 which is above and to the right of the bucket (Fig. 7), swings down against the fish in the bucket while it continues its bodily movement in a clockwise direction with the rotating disc 281. This swinging of the fork in its mounting, i. e., on its crank pin 277, is the result of the cam action of cam 309. The fish in fact is engaged by the fork head as soon as the bucket comes into place.

In Fig. 7 there is illustrated the crowding of the fish from the bucket and the discharge is here completed as the fork head 275 still presses the fish mass forward into the restraining tunnel and into the frame part 322. As soon as the fork head passes clear of the bucket, the latter makes its next step advancement with the conveyor G. The actuation of each fork as it thus passes from right to left, is such as to maintain substantially a vertical position. The fork head is still vertical as it slowly pulls out through the spaces of the grid bars 316 and leaves the fish mass, but the next bucket is in place and the following fork is against the fish before the preceding fork clears.

In this way the mass of fish in the restraining tunnel is kept in compact position and at no time is the pressure on the fish released. This provides the uniform filling fish mass which is so desirable and which will be further disposed of by filling into cans as previously described. The exact amount of pressure which may be imparted by the forks 275 may be set by the operator for a desired value so that a uniform predetermined compression is maintained at all times in the tunnel.

The maintenance of a uniform setting for compression against the fish mass is automatic once the adjustment has been made. It relates back to the control of a setting on the "Oilgear" unit O. As the supply of fish fills the tunnel so that more fish might cause the desired compression to be exceeded, the "Oilgear" is quickly shifted so that the driving gear reduction is increased and the various operations incident to feeding the fish to the tunnel are slowed down.

On the other hand, if the set compression on the fish mass in the restraining tunnel falls below the desired value, which means that the tunnel is not sufficiently filled with fish, this condition immediately changes the driving ratio through the "Oilgear" O and increases the quantity of fish fed into the tunnel within a given time. This adjustment of the "Oilgear" is very sensitive, and very accurate, and consideration will now be given to the devices for producing this result.

"Oilgear" reduction ratio control

The "Oilgear" O may be set for any speed ratio, within limits between its input drive shaft 122 and its output or driven shaft 126. In the case of an "Oilgear" reduction device as already referred to, the control or shift element will be in the nature of a valve shift. Such a valve shift is best made through a valve shaft 351 (Figs. 9 and 17) which extends outside of the "Oilgear" housing and into position for manipulation.

An arm 352 is mounted on the shaft 351 and the end of the arm is pivotally connected at 353 to one end of a connecting rod 354. The opposite end of the rod is joined to an elongated clevis 355 which straddles a curved slotted arm 356 secured to one end of a rock shaft 357. The shaft 357 is journalled in bearings 358, 359 (Fig. 13) formed in the frame section 121 and in a bearing 361 formed in the frame section 224.

The clevis 355 carries a pin 365 which extends between the side walls of the clevis and passes through the slot, indicated by the numeral 366, of the arm 356. A roller 367 is preferably mounted on the pin 365 and rests within the slot 366.

It is the rock shaft 357 that is moved by the deficient or excessive fish tunnel compression and the shifting of the shaft is made in accordance with whether more or less fish is wanted. The manner of shifting the rock shaft 357 will be fully explained hereinafter, but first will be noted the effect of any movement of the shaft 357 on the "Oilgear" O.

Rocking of the shaft 357 causes movement of the arm 356 which pressing against the roller 367 of the clevis, pulls or pushes against the rod 354 and rocks the valve shaft 351 in the proper direction to increase or decrease the speed of rotation of the shaft 126 from which all of the various elements of the machine are actuated, excepting the gang cutters F.

Provision is made for making the automatic shifting of the shaft 357 more or less effective in its shifting of the control shaft 351 of the "Oilgear." In other words, provision is made for manually rendering the response of the "Oilgear" to an oscillation of the shaft 357 more or less in amount, and by the same token for producing a quicker or slower changing of feeding conditions. This is done by changing the throw of the arm 356 as it becomes effective for moving the shaft 351.

The place within the slot 366 of the arm 356 where the roller 367 rests determines the amount of effective throw of the arm upon the oil valve shaft 351. If the roller is at the top of the slot any movement of the shaft 357 is greatly multiplied and if at the bottom of the slot, that is, close to the shaft 357, any throw of the latter is minimized.

The clevis 355 is raised and lowered by connection with a manual handle box 371 (Figs. 13, 16 and 17) which is mounted in a convenient position on the housing 121. It is by this means that the compression of the fish mass within the tunnel is set for a desired predetermined value, all adjustments made in the handle box 371 changing the position of the clevis connection with the arm 356, or in other words altering the place where the roller 367 rests in the arm slot 366.

The handle box carries a vertical shaft 372 on the top of which may be mounted a hand wheel 373 by means of which easy turning of the shaft is effected. Shaft 372 is provided with worm threads 374 which mesh with a segmental rack 375 mounted on a pivot shaft 376 journalled in the handle box. Shaft 376 also carries an arm 377 located outside of the box. The turning of shaft 372 through the worm and rack connections 374, 375 rocks the arm 377. A pointer 378 carried on the pivot shaft 376 provides a ready reference indicator when used with a dial plate 379 mounted on the box.

The outer end of the arm 377 is pivotally connected at 381 to the upper end of a rod 382 and the lower end of the rod is pivotally connected at 383 to the clevis 355. By this arrangement it will be seen that the position of the clevis roller 367 within the slot 366 is maintained at any desired height by setting of the hand wheel 373. This therefore conditions the connection with the "Oilgear" valve shaft 351 as desired so that just the effect wanted will be obtained by any given oscillation of the rock shaft 357.

Reference should be had to Fig. 17, in which is disclosed the various elements associated with the operation of the rock shaft 357. When a discharge fork head 275, preparatory to removing the fish mass from a positioned bucket 206, engages the fish in the bucket at the discharge station, it meets with a certain amount of resistance. The amount of fish in the tunnel J, or, more particularly the compactness of the mass, will determine the resistance counteracting against the action of the fork as it forces the new charge of fish into the tunnel. In other words, the compression of the fish mass within the tunnel will become effective as a resistance against the discharge fork head.

Following the time of engagement of the fish mass, the fork head 275 being carried around with the rotatable disc 281, is being swung on its crank pin 277 by action of the cam 309. The outside wall of the cam groove 308 is continuous, as best shown in Fig. 18, but the inner wall is cut out at a corner of the cam. An insert or segment 391 when in normal position lies in this corner of the cam track, as in Fig. 18. Such a segment provides for the continuation of the inner wall of the cam groove.

The cam segment 391 is carried on the outer end of an arm 392 (see also Figs. 8 and 17) which is secured to a short rock shaft 393 (see Figs. 13 and 14). The rock shaft 393 is suitably journalled in bearings formed in the side walls of the housing 92.

Shaft 393 also carries a lever arm 394 which extends forward beneath the shaft 282 and above the arch frame 315. This lever arm is normally held in a lowered position, a pivotal connection 395 of the arm being made with a vertical rod 396 which passes through a lug 397 formed as an integral part of the arch frame 315.

The rod 396 has sliding movement through the lug and a spring 398 is carried on the lower end of the rod. This spring is interposed between the lower surface of the lug and a nut 399 in threaded position on the bottom end of the rod. When the lever arm 394 is in its normal position, as held by the spring 398, the corresponding arm 392 holds the cam segment 391 in the position illustrated in Fig. 18 where its outer walls complete a continuation of the inner wall of the cam groove 308.

Considering again the action of the fork head 275 just after engaging the fish mass, it will be understood that at the time the full resistance of compression of the fish within the tunnel becomes effective, the cam roller 307 of the fork boss 276 is traversing the cam path adjacent the cam segment 391. If the resistance offered by the fish is excessive, that is, greater than the normal compression desired in the fish tunnel, the cam roller 307 will press against and lift the cam segment.

When this lifting action takes place, the arms 392, 394 move up together with a rocking movement of the rock shaft 393, this being against the action of the spring 398. By setting the compression of the spring 398 to the desired adjustment, there will be established a value of compression where the fish mass resistance moves the lever arm 394. Movement of the lever arm effects a corresponding movement of the rock shaft 357 so that the "Oilgear" valve shaft 351 will be moved as will now be further explained.

When the forward end of the lever arm 394 moves up, as just described, it carries up a pair of links 401 the lower ends of which are pivotally connected to the lever arm as at 402 (Figs. 14 and 17). The upper ends of the links are pivotally connected at 403 to a block 404. Block 404 loosely surrounds a connecting rod 405 and lifting of the block, caused by conditions in the fish tunnel as just described, also raises the rod. The lower end of the rod is pivotally connected at 406 to a rocker arm 407 which is secured to an end of the rock shaft 357, this being on the end opposite the arm 356.

The resulting shift of the shaft 357 turns the valve shaft 351, this being counter clockwise as viewed in Figs. 9 and 15. This increases the reduction ratio through the "Oilgear" O and the drive shaft 126 is slowed down. This slows down the various mechanisms relating to the fish feeding, excepting the gang cutters E, so that less fish per unit of time will be brought into position for discharge into the tunnel.

This is another way of saying that there will be a longer interval of time between feeding of successive charges of fish to the tunnel. Since fish is being constantly removed from the tunnel in the can filling operation, this slowing down of the "Oilgear" control will soon change a crowded condition to a normal one.

The block 404 at its upper end is enlarged into a cupped head which provides support for a rubber disc 411. The rod 405 extends loosely through both the block and the rubber and projects above some distance. A conical collar 412 is threadedly secured to the rod 405 above the block and is held in an adjusted position by a locknut 413.

When the rod 405 is in lowered position, its collar 412 is seated in the rubber disc 411 and at the time the cam segment 391 is moved to raise the block 404, as just described, the collar is resting in the block. Both block and rod therefore move as a unit with the results hereinbefore noted. The positive lowering of the rod to seat the collar in the block head takes place just before each fork unit cam roller 307 moves adjacent the cam segment 391. This will be later described.

The rod 405 above the collar 412 carries a sleeve 415 which is of square cross-section and the sleeve is adjustably secured on the rod. For this purpose the rod is reduced in diameter at 416, this being above the threaded section containing the locknut 413. An adjusting nut 417 is threaded on the rod and provides the lower end stop for the sleeve 415. A locknut 418 holds the nut 417 and the sleeve in adjusted position.

At the top the rod section 416 is threaded to receive a head 419. This is screwed down on the upper end of the sleeve and forms the stop for the top end of the sleeve. This construction provides the upper end of the rod 405 with a square section which is utilized in a wedging action for keeping the rod in its raised position after the fork cam roller 307 has passed the cam segment 391 and the spring 398 has pulled back the lever arm 394, thus pulling the collar seat 411 downwardly away from the conical collar 412. This wedging and holding action of the rod 405 will next be considered.

Sleeve 415 extends between spaced arms 421 of a bracket 422 which extends inwardly from the housing 92 as best illustrated in Fig. 13. A pivot shaft 423 (Figs. 8 and 17) is carried in the ends of the bracket arms 421 and provides a pivotal support for a bell crank lever 424. An arm 425 of the bell crank lever extends forward and supports a U-shaped wedge block 426, the side walls of which extend on either side of the square sleeve 415. The wedge block provides a sliding way for three sides of the sleeve.

On the fourth side a wedge 431 normally rests against the sleeve, this wedge being larger at the top than at the bottom, the face opposite to the sleeve being inclined as best illustrated in Fig. 17. The inclined fourth side is slidably supported upon an inclined web 432 formed as a part of the bracket 422. A screw 433 projects outwardly from the inclined face of the wedge 431 where it extends through a slot 434 formed in the web. The head of this screw may be tightened against a washer.

The wedge is adapted to be adjusted in the desired position and is then positively held by tightening the screw. However, the sleeve 415 is free to be lifted, and when the rod 405 and sleeve are raised by the excessive resistance of the fish mass against the discharge forks 275, the wedge block 426 being also slightly raised. Rod 405 and sleeve 415 are prevented from falling back by a jamming of the wedge block 426 against the sleeve which is thereby forced over into tight engagement with the wedge 431.

It has already been mentioned that the rod 405 is positively returned to its lower position just prior to the fish mass making its resistance effective against the discharge forks. At that time the wedge block 426 is raised to release the rod 405 and the sleeve from the wedging action of the wedge parts 426, 431.

The bell crank lever 424 also has a second arm 435 which extends down, as best illustrated in Fig. 17, and on which a cam roller 436 is mounted. This roller is located adjacent a cam 437 which is mounted on the end of the shaft 282 (see also Fig. 8). Cam 437 is formed with four spaced projections 438 and as the shaft rotates the cam a projection strikes against and forces the roller out thus rocking the bell crank lever 434 and lifting the wedge block 426. The four projections 438 correspond with the four discharge forks 275, a projection to a fork.

The positive forcing down of the rod 405 at the time the wedge block 426 is lifted is the next feature to be considered. A cam 441 (Figs. 8, 14 and 17) is mounted adjacent the cam 437. The drawings illustrate the two cams as being integral with a connecting sleeve which is mounted on the shaft 282. Cam 441 is formed with four spaced peripheral notches 442 to correspond with the four discharge fork units. A notch of this cam corresponds in its action to a projection 438 of the cam 437 so that there will be proper cooperation between all of the movements being considered.

A bell crank lever 443 (Figs. 13, 14 and 17) is mounted on a shaft 444 which is carried in brackets 445 extending down from the housing wall 92. The bell crank lever 443 is formed with a cam arm 446 and a stroke arm 447. The arm 446 carries a cam roller 448 which rides on the periphery of the cam 441.

The hub of the bell crank 443 is also formed with a projecting lug 449 and a spring barrel 451 is slidably mounted within a bore 452 formed in a lug 453 projecting out from a wall of the housing 92. The spring barrel 451 engages beneath the lug 449 at all times being held in engagement by a spring 454 which also is located within the bore 452. This insures that the cam roller 448 at all times follows the periphery of the cam 441.

The stroke arm 447 of the bell crank lever 443 extends over the top of the head 419 of the vertical rod 405. When a depression 442 of the cam passes adjacent the cam roller 448, the spring 454 urging the bell crank lever on its support shaft 444, causes the cam roller to enter the depression and this rocks the bell crank lever on its shaft and lowers the stroke arm 447 so that it strikes against the head 419 and forces the rod 405 downwardly.

From the foregoing description of the manner of providing a predetermined compression and a predetermined quantity of fish in the supply tunnel J it will be now evident that the subsequent actual filling of the cans, as pointed out in my Patent 2,044,813, will result in uniformity since each can charge is taken from a uniformly packed mass of fish.

To recapitulate, as to this control of the feeding of fish into the tunnel, each discharge fork unit K while removing a bucket full of fish from the bucket conveyor G in effect tests the tunnel supply to determine whether there is a scarcity, a normal quantity or too much fish in the tunnel. Since fish is being constantly removed from the end of the tunnel in the can filling step and since a new fish supply is coming in at each bucket full, the actual tunnel contents is constantly changing. The value of the control is to keep the tunnel supply constant.

It will be assumed that the fish being cut and brought in by the bucket conveyor at any given time and at a given speed of operation of feeding is more than enough to balance the amount being taken out of the tunnel. In that case the very next discharge fork passing through the conveyor bucket and sweeping its charge of fish into the tunnel will meet with a resistance sufficient to overcome the holding action of the spring 398 and the cam segment 391 will move.

This is only a momentary action but it is sufficient to lift the lever arm 394 and the rod 405 through the described connections, and the "Oilgear" O will be slowed down. The rod will be held in its raised position by the wedge members 426, 431 and this holds the reduced "Oilgear" setting. The lever arm, however, immediately moves back under action of the spring, the cam roller 307 clearing the movable cam segment 391 and entering the fixed walls of the cam groove 308. The time the cam roller is in engagement with the cam segment is roughly only about one eighth of the full time required to make one complete revolution of the cam roller. This complete revolution corresponds in point of time to the intervals between the action of two fork units sweeping out their respective bucket charges.

The wedge hold for the rod 405 thus gives time for the reduction in speed of the feeding units through the "Oilgear" to slow down on the feeding of more fish into the tunnel, thereby giving time for removal of the fish mass in canning.

Just before the next discharge fork unit comes into position to discharge its next bucket load, the wedge block 426 is raised to free its hold on the rod 405. Immediately following, the stroke arm 447 of the bell crank 443 descends and returns the rod 405 to its lowered position. This action seats the collar 412 into the rubber 411. All of these operations have been fully described.

The "Oilgear" is thus again set to speed up feeding conditions, but the interval is so short before the next control cycle is repeated that should an oversupply in the tunnel still exist, the cam roller 307 would again move the cam segment 391 and again lower the rod 405 and change back the "Oilgear" to its slower setting. Practically this amounts to scarcely any interruption.

These actions are repeated for each fork unit until normal compression obtains in the supply tunnel. Thereafter as long as there is not excessive fish, each fork unit roller 307 passes the cam segment 391 without moving it and the rod 405 will then remain in lowered position. As long as it so remains the "Oilgear" is operating to impart a high speed to the fish feeding and bucket conveyor mechanisms.

It may be again recalled that the high speed setting of the "Oilgear" is made for each run of fish by means of the hand wheel 373 so that the fish supplied to the tunnel will slightly exceed that removed in the regular canning. With such a setting not many discharge forks operate to sweep out their fish charges from the bucket conveyor before the "Oilgear" valve shaft 351 is moved to slow down the feeding of the fish into the tunnel. In this way an exceedingly sensitive control of the amount of fish mass in the supply tunnel is obtained.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fish canning machine, the combination of a feeding tunnel for fish storage, a gang cutter for severing fish into can lengths, feeding devices for moving the fish through said cutter, a bucket conveyor for receiving the cut fish and for carrying it to said tunnel, means for actuating said conveyor intermittently to successively position each bucket with its contents in alignment with said tunnel, discharge forks for transferring the fish from a positioned bucket into the tunnel and for holding the fish in said tunnel under a predetermined compression, and control devices responsive to the pressure of fish in the tunnel against said discharge forks for varying the speed of delivery of fish to said discharge forks.

2. In a fish canning machine, the combination of a feeding tunnel for fish storage, a gang cutter for severing fish into can lengths, feeding devices for moving the fish through said cutter, a bucket conveyor for receiving the cut fish and for carrying it to said tunnel, means for actuating said conveyor intermittently to successively position each bucket in alignment with said tunnel, discharge forks for transferring the fish from a positioned bucket to said tunnel, and control devices responsive to the pressure of fish in the tunnel against said discharge forks for varying the speed of delivery of the fish to said cutter.

3. In a fish canning machine, the combination of a feeding tunnel for fish storage, a rotary gang cutter for severing fish into can lengths, feeding devices for moving the fish through said cutter, a bucket conveyor for receiving the cut fish and for carrying it to said tunnel, means for actuating said conveyor intermittently to successively position each bucket with its contents in alignment with said tunnel, discharge forks for transferring the fish contents from a positioned bucket to said tunnel and for holding the fish therein under a predetermined compression, means for continuously rotating said cutter, and means responsive to the pressure of fish in said tunnel against said discharge forks for reducing the speed of said feeding devices to lessen the amount of fish cut when the fish accumulation in said tunnel exceeds the desired compression.

4. In a fish canning machine, the combination of a feeding tunnel for fish storage, a gang cutter for severing fish into can lengths, feeding devices for moving the fish through said cutter, a bucket conveyor for receiving the cut fish and for carrying it to said tunnel, means for actuating said conveyor intermittently to successively position each bucket in alignment with said tunnel, discharge forks for transferring the fish from a positioned bucket to said tunnel, means for actuating said feeding devices to move the fish through said cutter after a given number of step movements of said bucket conveyor, and a clutch device for changing the number of step movements of said conveyor between successive cutting operations.

5. In a fish canning machine, the combination of a feeding tunnel for fish storage, a gang cutter for severing fish into can lengths, feeding devices for moving the fish through said cutter, a bucket conveyor for receiving the cut fish and for carrying it adjacent said tunnel, means for actuating said conveyor intermittently to first position the buckets for the reception of the cut fish and thence for successively positioning each bucket in alignment with said tunnel, and means for holding the cut fish in its bucket between its reception into a bucket and its positioning in alignment with said tunnel.

6. In a fish canning machine, the combination of a feeding tunnel for fish storage, a gang cutter for severing fish into can lengths, feeding devices for moving the fish through said cutter, a bucket conveyor for receiving the cut fish and for carrying it adjacent said tunnel, movable holding means for said conveyor adapted to open to receive the fish in the bucket and to close to hold the cut fish in its bucket during its movement with said conveyor, means for actuating said conveyor intermittently to first position the buckets for the reception of the cut fish and thence for successively positioning each bucket in alignment with said tunnel, and discharge forks for transferring the fish from a bucket into said tunnel.

7. In a fish canning machine, the combination of a feeding tunnel for fish storage, a gang cutter mounted adjacent said tunnel for severing fish into can lengths, feeding devices for bringing fish adjacent said cutter, feeding forks for moving the fish through said cutter, a bucket conveyor for receiving the cut fish and for carrying it adjacent said tunnel, discharge forks for transferring the cut fish from successive buckets and for packing the same in said tunnel to provide a compressed fish mass, and means for actuating said feeding devices, said feeding forks, said bucket conveyor and said discharge forks at respective rates of movement to insure a uniformly compressed mass of fish in said tunnel.

8. In a fish canning machine, the combination of a feeding tunnel for fish storage, a gang cutter mounted adjacent said tunnel for severing fish into can lengths, feeding forks for moving the fish through said cutter, a bucket conveyor for receiving the cut fish and for carrying it adjacent said tunnel, said feeding forks placing each cut of fish in a bucket and holding it therein while the forks are being withdrawn, holding means movable with said withdrawing forks for holding the cut fish in its bucket while being carried to said tunnel, and discharge forks for transferring the cut fish from said bucket conveyor into said tunnel.

9. In a fish canning machine, the combination of a feeding tunnel for fish storage, a gang cutter located adjacent said tunnel for severing fish into can lengths, feeding forks for passing the fish through said cutter, a bucket conveyor for receiving the cut fish and for carrying it to said tunnel, means for actuating said conveyor intermittently to position a plurality of buckets to receive the cut fish from said feeding forks and to successively position each bucket in alignment with said tunnel, said feeding forks operating to feed cut pieces of fish from a subsequent cutting into the same buckets which contain the previously cut pieces and to hold both pieces of fish in a said bucket while the fork moves away from the fish, and discharge forks for removing the fish from each bucket when it stops in alignment with said tunnel, said discharge forks pressing the fish into the tunnel and holding it under a predetermined compression.

10. In a fish canning machine, the combination of a feeding tunnel for fish storage, a gang cutter located adjacent said tunnel for severing fish into can lengths, feeding forks for passing the fish through said cutter, a bucket conveyor for receiving the cut fish and for carrying it to said tunnel, a rotatable disc mounted to move on a horizontal axis which is located above said tunnel, discharge forks carried on said rotatable disc for removing the fish from a bucket positioned in alignment with said tunnel, and actuating means for swinging each fork relative to said disc while being carried in a circular path of travel thereby to first remove the fish from the bucket and then press the same against the fish mass in the tunnel so as to retain a desired amount of fish in the tunnel.

11. In a fish canning machine, the combination of a feeding tunnel for fish storage, a gang cutter located adjacent said tunnel for severing fish into can lengths, feeding forks for passing the fish through said cutter, a bucket conveyor for receiving the cut fish and for carrying it to said tunnel, a rotatable disc mounted to rotate in a vertical plane alongside the mouth of said tunnel, and a plurality of discharge forks carried on said rotatable disc for removing the fish from each bucket as it comes in alignment with said tunnel, said discharge forks having movement relative to said disc while being carried thereby for pressing the fish into the tunnel and holding it under a predetermined compression.

12. In a fish canning machine, the combination of a feeding tunnel for fish storage, a gang cutter located adjacent said tunnel for severing fish into can lengths, feeding forks for passing the fish through said cutter, a bucket conveyor for receiving the cut fish and for carrying it to said tunnel, a rotatable disc mounted adjacent said tunnel, a plurality of crank pins carried by said rotatable disc, a discharge fork carried on each crank pin for removing the fish from a bucket positioned in alignment with said tunnel and for packing it into said tunnel, and cam actuated devices for shifting the positions of the discharge forks to insure engagement of the fish mass within the tunnel by each discharge fork before disengagement by the preceding fork.

13. In a fish canning machine, the combination of a feeding tunnel for fish storage, a gang cutter for severing fish into can lengths, feeding devices for moving the fish through said cutter, a bucket conveyor for receiving the cut fish and for carrying it to said tunnel, means for actuating said conveyor intermittently to successively position each bucket in alignment with said tunnel, discharge forks for transferring fish from a positioned bucket to said tunnel, a gear reduction unit for driving said feeding devices, bucket conveyor actuating means and said discharge forks, and means operative through said discharge forks for altering the reduction ratio in said gear reduction unit when excess fish fed into said tunnel by the forks tends to create abnormal compression.

14. In a fish canning machine, the combination of a feeding tunnel for fish storage, a gang cutter for severing fish into can lengths, feeding devices for moving the fish through said cutter, a bucket conveyor for receiving the cut fish and for carrying it to said tunnel, means for actuating said conveyor intermittently to successively position each bucket in alignment with said tunnel, discharge forks for transferring fish from a positioned bucket and for holding it in said tunnel under a yielding predetermined cam pressure, a gear reduction unit for driving said feeding devices, bucket conveyor actuating means and said discharge forks, means for increasing the reduction ratio and driving the parts dependent upon the said gear reduction unit at a slower speed when the compression of the fish mass within said tunnel exceeds the yielding cam pressure on said discharge forks, and adjusting elements for setting the effective change on said reduction ratio to a predetermined amount.

15. In a fish canning machine, the combination of a feeding tunnel for fish storage, a bucket conveyor for receiving cut fish and for carrying it to said tunnel, means for actuating said conveyor intermittently and at a predetermined speed to successively position each bucket in alignment with said tunnel, discharge forks for transferring the charges of cut fish from successively positioned buckets into said tunnel, means for yieldingly holding a said discharge fork as it packs the incoming fish charges into the mass of fish already in the tunnel, and control devices for changing the speed of movement of said conveyor actuating means in accordance with the yielding pressure of the fish mass on said fork holding means.

16. In a fish canning machine, the combination of a feeding tunnel for fish storage, a gang cutter for severing fish into can lengths, feeding devices for moving the fish through said cutter, a bucket conveyor for receiving the cut fish and for carrying it to said tunnel, means for actuating said conveyor intermittently to successively position each bucket in alignment with said tunnel, discharge forks for transferring charges of cut fish from successively positioned buckets into said tunnel, means for holding said fish mass as inserted into said tunnel by said forks in normally unyielding position as long as the quantity of fish in the tunnel does not exceed a given amount, and means for retarding the movements of said feeding devices, said bucket conveyor and said discharge forks when an excess of fish in said tunnel causes a yielding of a said discharge fork and a corresponding change in said fish holding means.

17. In a fish canning machine, the combination of a feeding tunnel for fish storage, a bucket conveyor for receiving cut fish and for carrying it to said tunnel, means for actuating said conveyor intermittently and at a predetermined speed to successively position each bucket in alignment with said tunnel, discharge forks for transferring the charges of cut fish from successively positioned buckets into said tunnel, a gear reduction unit for driving said bucket conveyor actuating means and said discharge forks, means for yieldingly holding a said discharge fork as it packs the incoming fish charges into the mass of fish already in the tunnel, control devices for changing the reduction ratio in said gear reduction unit to alter the speed of movement of the said bucket conveyor and of the said discharge forks when the pressure exerted by the fish mass in said tunnel acting upon the cut fish being inserted effects a yielding of a said discharge fork, and an adjustment element for setting the amount of pressure required for a yielding action of said fork.

18. In a fish canning machine, the combination of a feeding tunnel for fish storage, a gang cutter located adjacent said tunnel for severing fish into can lengths, feeding forks for passing the fish through said cutter, a bucket conveyor for receiving the cut fish and for carrying it to said tunnel, a rotatable disc mounted adjacent said tunnel, discharge forks carried by said rotatable disc, each fork being adapted to pass through a positioned bucket to remove the fish and to carry it into said tunnel, a gear reduction unit for driving said feeding forks, said bucket conveyor and said rotatable disc, a shift lever for changing the reduction ratio in said reduction unit, means for yieldingly positioning a moving discharge fork relative to said rotatable disc at the time a fish charge carried by the fork enters the said tunnel, and control devices connected with said shift lever for moving the latter to change the reduction ratio when the fish resistance within said tunnel causes yielding of a said discharge fork.

19. In a fish canning machine, the combination of a feeding tunnel for fish storage, a bucket conveyor for receiving cut fish and for carrying it to said tunnel, a rotatable disc mounted adjacent said tunnel, discharge forks carried by said rotatable disc, each fork being adapted to pass through a positioned bucket to remove the fish and to carry it into said tunnel, a gear reduction unit for driving said bucket conveyor and said rotatable disc, a shift lever for changing the reduction ratio in said reduction unit, means for yieldingly positioning a moving discharge fork relative to said rotatable disc at the time a fish charge carried by the fork enters the said tunnel, control devices connected with said shift lever for moving the latter to change the reduction ratio when the fish resistance within said tunnel causes yielding of a said discharge fork, adjusting elements for changing the throw of said shift lever to make the reduction ratio change more or less effective, and means for restoring the normal gear reduction ratio before each charge of fish enters into said tunnel.

20. In a fish canning machine, the combination of a feeding tunnel for fish storage, a cutter for severing fish into can lengths, feeding devices for moving the fish through said cutter, a conveyor for receiving the cut fish and for carrying it to said tunnel, means for actuating said conveyor to successively position said cut fish in alignment with said tunnel, a discharge fork for transferring the positioned cut fish into the tunnel and for holding the fish in said tunnel under a predetermined compression, and control means responsive to the pressure of fish in the tunnel against said discharge fork for varying the speed of delivery of said fish to said fork.

21. In a fish canning machine, the combination of a feeding tunnel for fish storage, a cutter for severing fish into can lengths, feeding devices for moving the fish through said cutter, a conveyor for receiving the cut fish and for carrying it to said tunnel, means for actuating said conveyor to successively position said cut fish in alignment with said tunnel, a discharge fork for transferring the positioned cut fish into the tunnel and for holding the fish in said tunnel for a predetermined compression, and control means responsive to the pressure of fish in the tunnel against said fork and operable to reduce the speed of delivery of fish to the fork upon increase of pressure in the tunnel, said control means being further operable to increase the speed of delivery of fish to the fork upon reduction of pressure in said tunnel.

WALTER E. ROONEY.